(12) United States Patent
Owejan et al.

(10) Patent No.: US 8,347,737 B2
(45) Date of Patent: Jan. 8, 2013

(54) PRESSURE SENSOR FOR USE IN FUEL CELL SYSTEMS

(75) Inventors: Jon P. Owejan, Honeoye, NY (US); Mark T. Schluentz, East Rochester, NY (US); Steven L. Piedmont, Macedon, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 193 days.

(21) Appl. No.: 12/987,377

(22) Filed: Jan. 10, 2011

(65) Prior Publication Data

US 2012/0174685 A1 Jul. 12, 2012

(51) Int. Cl.
*G01F 1/34* (2006.01)
(52) U.S. Cl. .................................................. 73/861.42
(58) Field of Classification Search ................ 73/38, 40, 73/861.42, 129
See application file for complete search history.

(56) References Cited

U.S. PATENT DOCUMENTS

| 7,587,927 B2 * | 9/2009 | Burke et al. | 73/38 |
| 2008/0105038 A1 * | 5/2008 | Jons et al. | 73/38 |

* cited by examiner

*Primary Examiner* — Jewel V Thompson
(74) *Attorney, Agent, or Firm* — Fraser Clemens Martin & Miller LLC; J. Douglas Miller

(57) ABSTRACT

A pressure sensor for measuring a pressure of a fluid in fluid flow path of a fuel cell system is disclosed. The pressure sensor includes a housing provided with a communication path formed between the fluid flow path and an interior of the housing, the communication path having a hydrophobic feature to militate against a formation and an accumulation of an undesired material within the pressure sensor.

20 Claims, 3 Drawing Sheets

PRESSURE SENSOR FOR USE IN FUEL CELL SYSTEMS

FIELD OF THE INVENTION

The present invention relates generally to a fuel cell system and, more particularly, to a pressure sensor for use in a wet environment of the fuel cell system.

BACKGROUND OF THE INVENTION

A fuel cell has been proposed as a clean, efficient and environmentally responsible power source for electric vehicles and various other applications. In particular, the fuel cell has been identified as a potential alternative for the traditional internal-combustion engine used in modern vehicles.

One type of fuel cell is known as a proton exchange membrane (PEM) fuel cell. The PEM fuel cell typically includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode layers to form a membrane-electrode-assembly (MEA). The MEA is often disposed between porous diffusion media (DM) which facilitate a delivery of gaseous reactants, typically hydrogen from a hydrogen source and oxygen from an air stream, for an electrochemical fuel cell reaction. In automotive applications, individual fuel cells are often stacked together in series to form a fuel cell stack having a voltage sufficient to power an electric vehicle. The DM's and MEA are pressed between a pair of electronically conductive plates which conduct current between adjacent cells internally of the stack in the case of bipolar plates and conduct current externally of the stack in the case of monopolar plates at the end of the stack.

The plates each contain at least one active region that distributes the gaseous reactants over major faces of the anode and cathode. These active regions, also known as flow fields, typically include a plurality of flow channels to supply the gaseous reactants to the electrodes on either side of the PEM from an intake manifold. In particular, the hydrogen flows through the channels to the anode where the catalyst promotes separation into protons and electrons. On the opposite side of the PEM, the oxygen flows through the channels to the cathode where the oxygen attracts the hydrogen protons through the PEM. The electrons are captured as useful energy through an external circuit and are combined with the protons and oxygen to produce water vapor at the cathode side.

The flow of reactants through the channels must be precise to maintain optimum performance of the fuel cell. The flows of the reactants are typically monitored by one or more pressure sensors in communication with the flow paths of the reactants. Inaccurate pressure measurements by the sensors can result in a low reactant pressure within the fuel cell. Low reactant pressure can lead to an insufficient supply of the reactants necessary to produce the desired electrical output. Alternatively, inaccurate pressure measurements can result in high reactant pressure that can cause other issues. Known pressure sensors are susceptible to such inaccurate measurements when the fuel cell is operating at a sub-zero temperature, or a temperature below the freezing point of water. Such temperatures may cause the water vapor within the fuel cell to condense and freeze. The frozen condensate can interfere with communication between the reactant flow path and the pressure sensor, resulting in inaccurate pressure measurements. Over time, the frozen condensate may also cause corrosion of the pressure sensor, reducing the useful life of the sensor.

It is desirable to produce a pressure sensor for a fuel cell system that optimizes a durability and an accuracy of the pressure sensor, particularly during operating conditions in which water within the fuel cell system freezes.

SUMMARY OF THE INVENTION

In concordance and agreement with the present invention, a pressure sensor for a fuel cell system that optimizes a durability and an accuracy of the pressure sensor, particularly during operating conditions in which water within the fuel cell system freezes, is surprisingly discovered.

In one embodiment, the pressure sensor comprises: a housing having a hollow interior formed therein and an inlet conduit extending outwardly therefrom; and a communication path formed by the inlet conduit and an aperture formed in a wall of the housing, the communication path including a hydrophobic feature which militates against at least one of a formation and an accumulation of an undesired material in the communication path, wherein the communication path permits a flow of a fluid to the interior of the housing to facilitate a pressure measurement of the fluid.

In another embodiment, the pressure sensor comprises: a housing having a hollow interior formed therein and an inlet conduit extending outwardly therefrom, the housing having a communication path formed therein including the inlet conduit and an aperture formed in a wall of the housing, wherein the communication path permits a flow of a fluid to the interior of the housing to facilitate a pressure measurement of the fluid; and a hydrophobic insert at least partially disposed in the communication path which militates against at least one of a formation and an accumulation of an undesired material in the communication path, the hydrophobic insert having a first end disposed within the inlet conduit of the housing and a second end extending into the fluid flow path.

In another embodiment, the pressure sensor comprises: a housing having a hollow interior formed therein and an inlet conduit extending outwardly therefrom; and a communication path formed by the inlet conduit and an aperture formed in a wall of the housing, at least a portion of the inlet conduit including an enhanced inner surface which causes the surface to be hydrophobic and militates against at least one of a formation and an accumulation of an undesired material in the communication path, wherein the communication path permits a flow of a fluid to the interior of the housing to facilitate a pressure measurement of the fluid.

DRAWINGS

The above, as well as other advantages of the present invention, will become readily apparent to those skilled in the art from the following detailed description, particularly when considered in the light of the drawings described hereafter.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
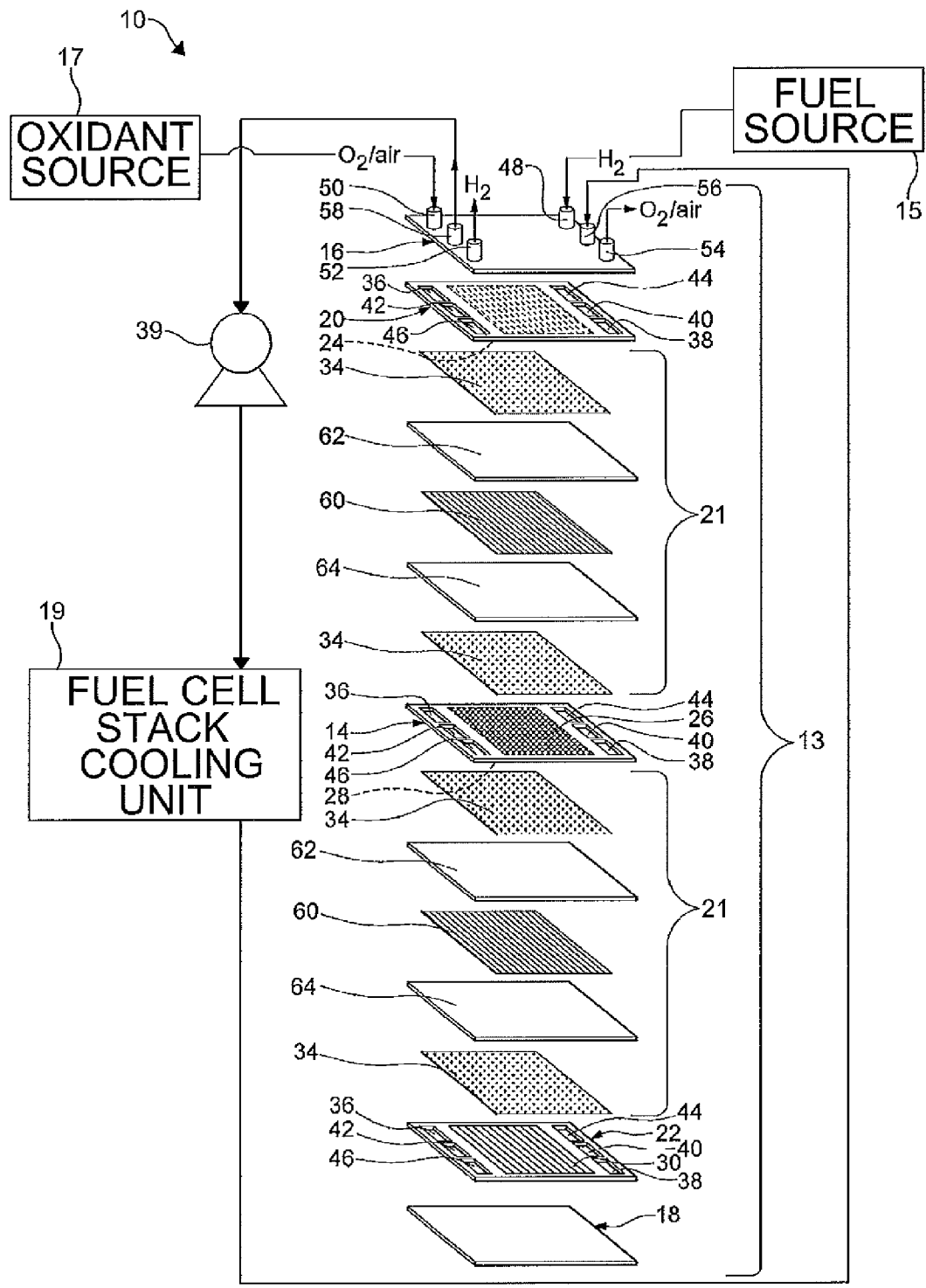
FIG. 1 illustrates a schematic block diagram of a fuel cell system of the prior art.

FIG. 1 depicts a fuel cell system 10 including a fuel cell stack 13, a fuel source 15, an oxidant source 17, and a fuel cell stack cooling unit 19. The fuel source 15 can be any fuel source as desired such as a fuel tank, for example. The oxidant source 17 can be any oxidant source as desired such as an air blower, for example. It is understood that the fuel cell system 10 may include other components for operation such as an electronic control unit or module, a water vapor transfer unit, a compressor, and the like, for example. The fuel cell stack 13 shown is a proton exchange membrane (REM) fuel cell stack including a pair of proton exchange membrane fuel cells (PEMFCs). It is understood that the fuel cell system 10 can be any type of fuel cell system as desired. For simplicity, a fuel cell system 10 with a two-cell fuel cell stack 13 is illustrated and described in FIG. 1, it being understood that a typical fuel cell stack 13 has many more such PEMFCs and bipolar plates.

Each of the PEMFCs shown includes a unitized electrode assembly (UEA) 21. The UEAs 21 are separated from each other by an electrically conductive bipolar plate 14. The UFAs 21 have an anode 62, a cathode 64, and an electrolyte membrane 60. The UEAs 21 and the bipolar plate 14 are stacked together between a pair of terminal plates 16, 18 and a pair of unipolar end plates 20, 22. The unipolar end plate 20, both working faces of the bipolar plate 14, and the unipolar end plate 22 include respective active areas 24, 26, 28, 30. The active areas 24, 26, 28, 30 typically contain flow fields for distributing gaseous reactants such as a fuel (e.g. hydrogen gas) and an oxidant (e.g. air or oxygen gas) over the anode 62 and the cathode 64, respectively, of the UEAs 21.

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer. Gas-permeable diffusion media (DM) 34 are disposed adjacent both sides of the bipolar plate 14. The unipolar end plates 20, 22 are also disposed adjacent the diffusion media 34.

The bipolar plate 14, unipolar end plates 20, 22, and the UEAs 21 each include an oxidant supply aperture 36 and an oxidant exhaust aperture 38, a coolant supply aperture 40 and a coolant exhaust aperture 42, and a fuel supply aperture 44 and a fuel exhaust aperture 46. Supply manifolds and exhaust manifolds of the fuel cell stack 13 are formed by an alignment of the respective apertures 36, 38, 40, 42, 44, 46 in the bipolar plate 14, unipolar end plates 20, 22, and the UEAs 21. The fuel is supplied from the fuel source 15 to a fuel supply manifold of the fuel cell stack 13 via a fuel supply conduit 48. The oxidant is supplied from the oxidant source 17 to an oxidant supply manifold of the fuel cell stack 13 via an oxidant supply conduit 50. A fuel exhaust conduit 52 and an oxidant exhaust conduit 54 are also provided for a fuel exhaust manifold and an oxidant exhaust manifold, respectively. A coolant supply conduit 56 is provided for supplying a coolant (e.g. a liquid anti-freeze solution) to a coolant supply manifold. A coolant exhaust conduit 58 is provided for removing coolant from a coolant exhaust manifold. It should be understood that the configurations of the various supply conduits 48, 50, 56 and exhaust conduits 52, 54, 58 in FIG. 1 are for the purpose of illustration, and other configurations may be chosen as desired.

The fuel cell stack 13 generates electrical energy through an electrochemical reaction between the fuel and the oxidant. Portions of the oxidant and the fuel that are supplied to the fuel cell stack 13 remain unreacted during the electrochemical reaction between the fuel and the oxidant. The remaining fuel is exhausted from the fuel cell stack 13 through the fuel exhaust conduit 52. The remaining oxidant is exhausted from the fuel cell stack 13 through the oxidant exhaust conduit 54. The fuel cell stack cooling unit 19 shown is a heat exchanger. It is understood, however, that any heat exchanger can be employed such as a radiator, for example. An outlet of the fuel cell stack cooling unit 19 is in fluid communication with the coolant supply manifold of the fuel cell stack 13 through the coolant supply conduit 56. An inlet of the fuel cell stack cooling unit 19 is in fluid communication with the coolant exhaust manifold of the fuel cell stack 13 through the coolant exhaust conduit 58. A coolant pump 39 is disposed in the coolant exhaust conduit 58. The coolant pump 39 causes the coolant to circulate through the fuel cell stack cooling unit 19, the coolant supply conduit 56, the fuel cell stack 13, and the coolant exhaust conduit 58. Heat generated in the fuel cell stack 13 as a result of the electrochemical reaction between the fuel and the oxidant is transferred the coolant circulating through the fuel cell stack 13. The heated coolant is then caused to flow to the fuel cell stack cooling unit 19, whereby the heat is transmitted to the atmosphere.

Figure 2:
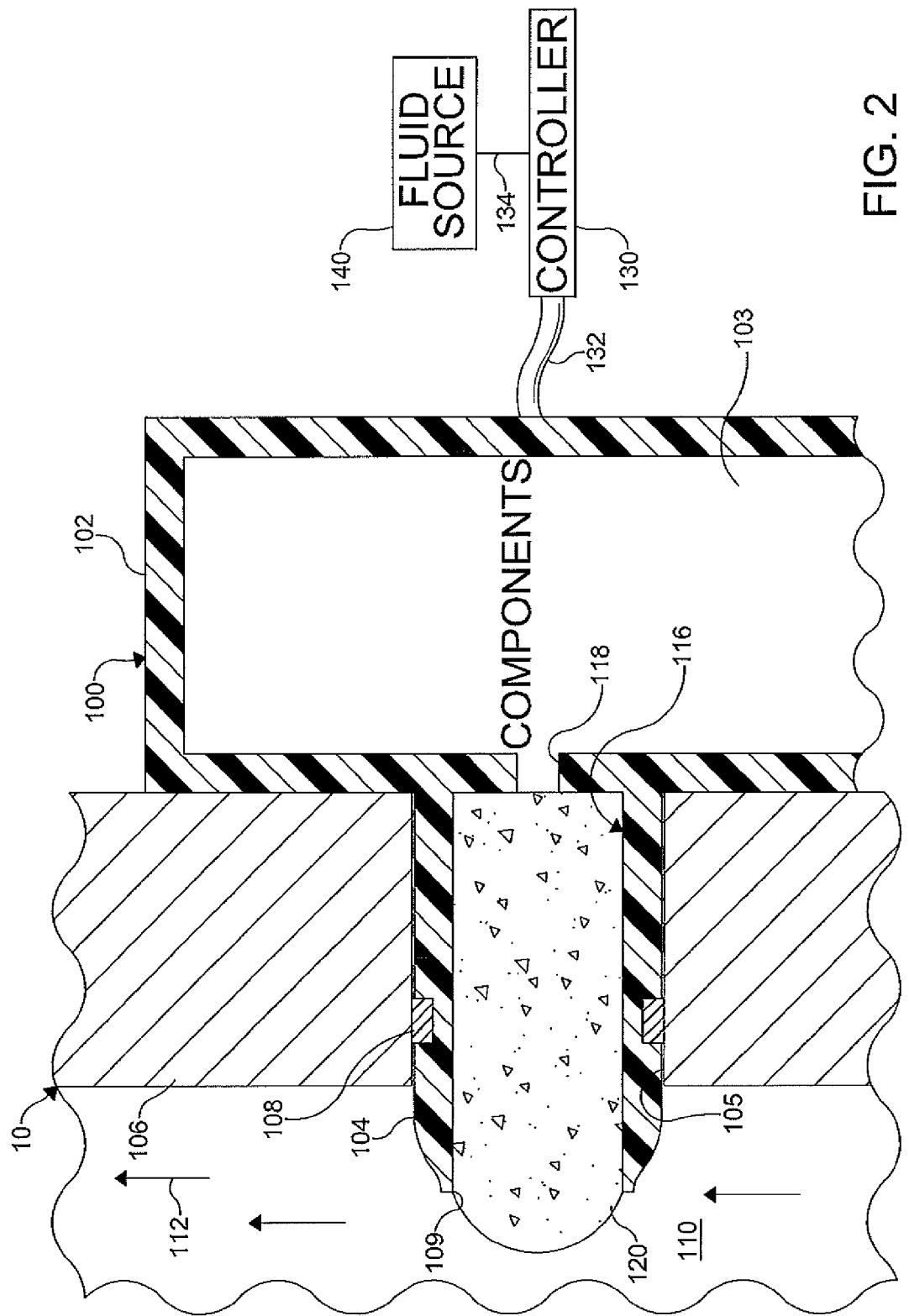
FIG. 2 is a schematic, enlarged cross-sectional view of a pressure sensor according to an embodiment of the invention.

FIG. 2 shows a pressure sensor 100 for use with the fuel cell system 10. It is understood that the pressure sensor 100 can be used with any fuel cell system as desired. In the embodiment shown, the pressure sensor 100 is a manifold absolute pressure sensor. It is understood, however, that the pressure sensor 100 can be any type of sensor as desired. The pressure sensor 100 includes a housing 102 having a hollow interior 103 and an inlet conduit 104 extending laterally outwardly from the housing 102. The inlet conduit 104 is received in a port 105 formed in a structural member 106 of the fuel cell system 10. It is understood that the structural member 106 can be any structural member typically found in a fuel cell system 10 including, but not limited to, the fuel supply conduit 48, the oxidant supply conduit 50, the fuel exhaust conduit 52, the oxidant exhaust conduit 54, the coolant supply conduit 56, the coolant exhaust conduit 58, an anode supply manifold (not shown), an anode exhaust manifold (not shown), a cathode supply manifold (not shown), a cathode exhaust manifold (not shown), and active areas of end plates or bipolar plates of the fuel cell stack 13, for example.

A sealing element 108 is provided between the inlet conduit 104 and the structural member 106 to form a substantially fluid-tight seal therebetween. It is understood that the sealing element 108 can be any suitable sealing element such as an o-ring, for example. It is further understood that the pressure sensor 100 can be coupled to the structural member 106 of the fuel cell system 10 by any means as desired such as flush mount sensor coupled to the housing by an adhesive, for example. As illustrated, an inlet orifice 109 of the inlet conduit 104 is disposed in a fluid flow path 110 of the fuel cell system 10 and in fluid communication with a fluid stream. It is understood that the fluid flow path 110 can be any fluid flow path of the fuel cell system 10 as desired. A fluid 112 of the fluid stream within the fluid flow path 110 typically is a gas that includes water vapor. It is understood, however, that the fluid 112 can be any fluid as desired such as the fuel supplied to the anode or the oxidant supplied to the cathode, and the coolant that circulates to assist in maintaining a desired temperature of the fuel cell stack 13, for example.

The pressure sensor 100 includes a hydrophobic feature to militate against a formation and an accumulation of an undesired material (not shown) within the pressure sensor 100 which may cause inaccurate pressure measurements of the fluid 112 and damage to the pressure sensor 100. In the embodiment shown in FIG. 2, the hydrophobic feature is a porous insert 120. The porous insert 120 is disposed in a communication path 116 provided by the inlet conduit 104 and an aperture 118 formed in a wall of the housing 102 of the pressure sensor 100. The communication path 116 permits the flow of the fluid 112 from the inlet orifice 109 of the inlet conduit 104 into the hollow interior 103 of the housing 102. As illustrated, the porous insert 120 substantially fills the communication path 116 and extends the entire length of the inlet conduit 104. A substantially planar first end is disposed within the inlet conduit 104 and a substantially dome-shaped second end extends into the fluid flow path 110 to increase surface area of the porous insert 120 exposed to the fluid 112. It is understood, however, that the porous insert 120 can have any suitable shape and size as desired such as having a substantially planar or substantially conical second end, for example.

In the embodiment shown, the porous insert 120 is formed from a foam material such as a hydrophobic open cell foam which militates against a formation and an accumulation of frozen water condensate (i.e. ice) with the pressure sensor 100. It is understood that the porous insert 120 may be any conductive or non-conductive open cell porous material, such as a fibrous material and a sponge or an assembly of a plurality of porous materials, for example. It is further understood that the porous insert 120 may have a hydrophobic surface treatment such as a chemical coating, for example. The porous insert 120 may also be of constant pore size and porosity, or of varying pore size and porosity such as a higher density material with small pore sizes to maximize flow resistance of the fluid 112 through the communication path 116 or a lower density material with larger pore sizes to minimize flow resistance of the fluid 112 through the communication path 116, for example.

Components (not shown) for operation of the pressure sensor 100, including but not limited to, a sensor member and a circuit board, are disposed in the hollow interior 103 of the housing 102. The components measure, generate, and transmit a signal indicative of a pressure of the fluid 112 in the fluid flow path 110. In the embodiment shown, the components measure, generate, and transmit a signal indicative of an absolute pressure of the fluid 112. A controller 130 such as the electronic control unit or module of the fuel cell system 10, for example, is in electrical communication with the components of the pressure sensor 100. It is understood that the components can be in electrical communication with the controller 130 by any suitable means such as via a wire 132, for example. The controller 130 receives the signal from the components and selectively modifies the pressure of the fluid 112 based upon the pressure measurements. In the embodiment shown, the controller 130 selectively modifies the pressure of the fluid 112 by generating and transmitting a signal 134 to a control mechanism (not shown) such as a valve, for example, which is used to control a flow of the fluid 112 from a source 140 of the fluid 112 such as the fuel source 15, the oxidant source 17, and a coolant source (not shown), for example.

In operation, the pressure sensor 100 monitors the pressure of the fluid 112 flowing through the fluid flow path 110. Particularly, the fluid 112 flows into the inlet orifice 109 and through the communication path 116 to be measured and analyzed by the components disposed in the interior 103 of the housing 102. As the fluid 112 flows through the communication path 116, the fluid 112 condenses on surfaces of the porous insert 120 disposed therein. Capillary forces of the porous insert 120 militate against an entry and an accumulation of the condensate within the communication path 116 and damage to the pressure sensor 100. Thus, the risk of inaccurate pressure measurements and other issues relative to the fuel cell assembly 10 is minimized. When the operation occurs at a sub-zero temperature or a temperature below the freezing point of water, the porous insert 120 militates against a formation and an accumulation of ice within the communication path 116 which may cause a blockage of the inlet conduit 104 and the aperture 118, further minimizing the risk of inaccurate pressure measurements and other issue relative to the pressure sensor 100 and fuel cell assembly 10.

Once the fluid 112 reaches the interior 103 of the housing 102, the components measure the pressure of the fluid 112. The components then generate and transmit a signal indicative of the absolute pressure of the fluid 112 to the controller 130. The controller 130 receives the signal from the components and, thereafter, selectively modifies the pressure of the fluid 112 by generating and transmitting the signal 134 to control the flow of the fluid 112 from the source 140 of the fluid 112.

Additionally, following an operation of the fuel cell assembly 10, the fuel cell system is shut down. The fluid flow path 110 and the communication path 116 through which the fluid 112 flows begin to cool. Upon reaching the dew point temperature, condensate forms on surfaces in contact with the fluid 112, including the inlet conduit 104 and the communication path 116 of the pressure sensor 100. As described hereinabove, the capillary forces of the porous insert 120 cause the condensate to be repelled and returned to the fluid flow path 110, militating against the accumulation of the condensate within the communication path 116, the formation and accumulation of ice within the pressure sensor 100.

Figure 3:
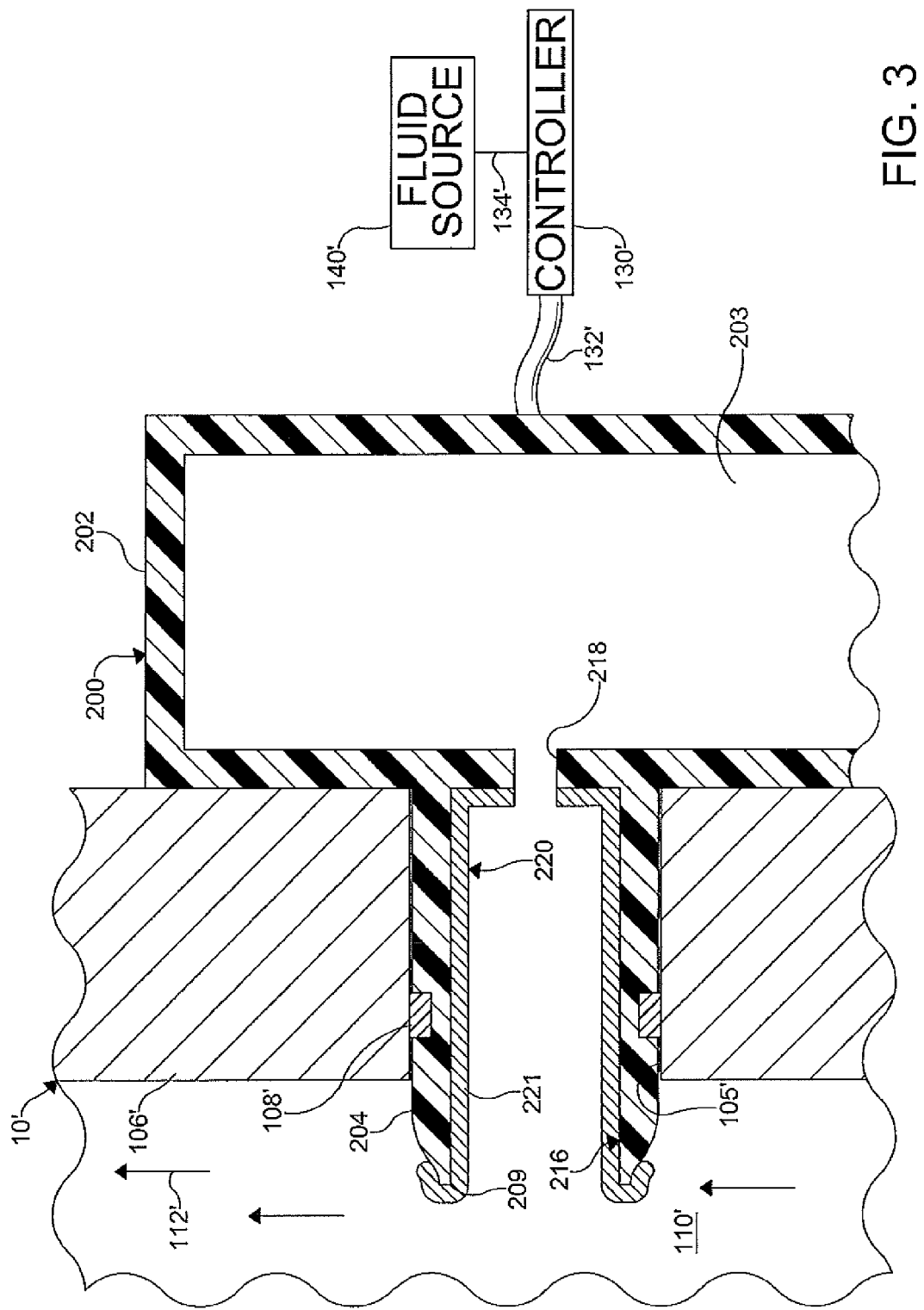
FIG. 3 is a schematic, enlarged cross-sectional view of a pressure sensor according to another embodiment of the invention.

FIG. 3 depicts a pressure sensor 200 according to another embodiment of the invention. Reference numerals for similar structure in respect of the discussion of FIG. 2 above are repeated with a prime (') symbol. The pressure sensor 200 for use with the fuel cell system 10'. It is understood that the pressure sensor 200 can be used with any fuel cell system as desired. In the embodiment shown, the pressure sensor 200 is a manifold absolute pressure sensor. It is understood, however, that the pressure sensor 200 can be any type of sensor as desired. The pressure sensor 200 includes a housing 202 having a hollow interior 203 and an inlet conduit 204 extending laterally outwardly from the housing 202. The inlet conduit 204 is received in a port 105' formed in a structural member 106' of the fuel cell system 10'. It is understood that the structural member 106' can be any structural member typically found in a fuel cell system 10' including, but not limited to, the fuel supply conduit 27, the oxidant supply conduit 29, the fuel exhaust conduit 31, the oxidant exhaust conduit 33, the coolant circulating conduit 37, an anode supply manifold (not shown), an anode exhaust manifold (not shown), a cathode supply manifold (not shown), a cathode exhaust manifold (not shown), and active areas of end plates or bipolar plates of the fuel cell stack 13, for example A sealing element 108' is provided between the inlet conduit 204 and the structural member 106' to form a substantially fluid-tight seal therebetween. It is understood that the sealing element 108' can be any suitable sealing element such as an o-ring, for example. It is further understood that the pressure sensor 200 can be coupled to the structural member 106' of the fuel cell system 10' by any means as desired such as flush mount sensor coupled to the housing by an adhesive, for example. As illustrated, an inlet orifice 209 of the inlet conduit 204 is disposed in a fluid flow path 110' of the fuel cell system 10' and in fluid communication with a fluid stream. It is understood that the fluid flow path 110' can be any fluid flow path of the fuel cell system 10'. A fluid 112' of the fluid stream within the fluid flow path 110' typically is a gas that includes water vapor. It is understood, however, that the fluid 112' can be any fluid as desired such as the fuel supplied to the anode or the oxidant supplied to the cathode, and the coolant that circulates to assist in maintaining a desired temperature of the fuel cell stack 13, for example.

A communication path 216 is provided by the inlet conduit 204 and an aperture 218 formed in a wall of the housing 202 of the pressure sensor 200. The communication path 216 permits the flow of the fluid 112' from the inlet orifice 209 of the inlet conduit 204 into the hollow interior 203 of the housing 202. The pressure sensor 200 includes a hydrophobic feature to militate against a formation and an accumulation of an undesired material (not shown) within the pressure sensor 200 which may cause inaccurate pressure measurement of the fluid 112' and damage to the pressure sensor 200. In the embodiment shown in FIG. 3, the hydrophobic feature is at least a portion of the communication path 216 including an enhanced surface 220. As the term is used herein, the "enhanced surface" is a surface wherein a surface energy thereof is reduced and caused to be hydrophobic. The enhanced surface 220 may be provided by any conventional means as is known in the art, such as mechanically or chemically treating, coating, or any combination thereof, for example. It is understood that mechanically treating may include processes such as sandblasting, shotpeening, milling, and grinding, for example, and chemically treating may include anodic oxidation, caustic treatments, or any combination thereof, for example.

In the embodiment shown, the enhanced surface 220 of the communication path 216 is provided by a coating 221 deposited on an inner surface of the inlet conduit 204. The coating 221 may comprise any suitable material such as polytetrafluoroethylene (PTFE), polyethylene, silicone, polypropylene, nanoparticles, and any combination thereof, for example. The enhanced surface 220 militates against a formation and an accumulation of an undesired material (not shown) within the communication path 216 which may cause inaccurate pressure measurements of the fluid 112' and damage to the pressure sensor 200. It is understood that the aperture 218 of the communication path 216 may include an enhanced surface if desired.

Components (not shown) for operation of the pressure sensor 200, including but not limited to, a sensor member and a circuit board, are disposed in the hollow interior 203 of the housing 202. The components measure, generate, and transmit a signal indicative of a pressure of the fluid 112' in the fluid flow path 110'. In the embodiment shown, the components measure, generate, and transmit a signal indicative of an absolute pressure of the fluid 112'. A controller 130' such as the electronic control unit or module of the fuel cell system 10', for example, is in electrical communication with the components of the pressure sensor 200. It is understood that the components can be in electrical communication with the controller 130' by any suitable means such as via a wire 132', for example. The controller 130' receives the signal from the components and selectively modifies the pressure of the fluid 112' based upon the pressure measurements. In the embodiment shown, the controller 130' selectively modifies the pressure of the fluid 112' by generating and transmitting a signal 134' to a control mechanism (not shown) such as a valve, for example, which is used to control a flow of the fluid 112' from a source 140' of the fluid 112' such as the fuel source 15, the oxidant source 17, and a coolant source (not shown), for example.

In operation, the pressure sensor 200 monitors the pressure of the fluid 112' flowing through the fluid flow path 110'. Particularly, the fluid 112' flows into the inlet orifice 209 and through the communication path 216 to be measured and analyzed by the components disposed in the interior 203 of the housing 202. As the fluid 112' flows through the communication path 216, the fluid 112' condenses on surfaces thereof. The enhanced surface 220 of the communication path 216 militates against an accumulation of the condensate within the communication path 216 and damage to the pressure sensor 200. Thus, the risk of inaccurate pressure measurements and other issues relative to the fuel cell assembly 10' is minimized. When the operation occurs at a sub-zero temperature or a temperature below the freezing point of water, the enhanced surface 220 militates against a formation and an accumulation of ice within the communication path 216 which may cause a blockage of the inlet conduit 204 and the aperture 218, further minimizing the risk of inaccurate pressure measurements and other issue relative to the pressure sensor 200 and fuel cell assembly 10'.

Once the fluid 112' reaches the interior 203 of the housing 202, the components measure the pressure of the fluid 112'. The components then generate and transmit a signal indicative of the absolute pressure of the fluid 112' to the controller 130'. The controller 130' receives the signal from the components and, thereafter, selectively modifies the pressure of the fluid 112' by generating and transmitting the signal 134' to control the flow of the fluid 112' from the source 140' of the fluid 112'.

Additionally, following an operation of the fuel cell assembly 10', the fuel cell system is shut down. The fluid flow path 110' and the communication path 216 through which the fluid 112' flows begin to cool. Upon reaching the dew point temperature, condensate forms on surfaces in contact with the fluid 112', including the inlet conduit 204 and the communication path 216 of the pressure sensor 200. As described hereinabove, the enhanced surface 220 of the communication path 216 causes the condensate to be repelled and returned to the fluid flow path 110', militating against the accumulation of the condensate within the communication path 216, the formation and accumulation of ice within the pressure sensor 200.

While certain representative embodiments and details have been shown for purposes of illustrating the invention, it will be apparent to those skilled in the art that various changes may be made without departing from the scope of the disclosure, which is further described in the following appended claims.

What is claimed is:
1. A pressure sensor comprising:
a housing having a hollow interior formed therein and an inlet conduit extending outwardly therefrom; and
a communication path formed by the inlet conduit and an aperture formed in a wall of the housing, the communication path including a hydrophobic feature which militates against at least one of a formation and an accumulation of an undesired material in the communication path, wherein the communication path permits a flow of a fluid to the interior of the housing to facilitate a pressure measurement of the fluid.

2. The pressure sensor according to claim 1, wherein the hydrophobic feature of the communication path is a hydrophobic insert disposed therein.

3. The pressure sensor according to claim 2, wherein the hydrophobic insert entirely fills the inlet conduit.

4. The pressure sensor according to claim 2, wherein the hydrophobic insert has a substantially planar first end and a substantially dome-shaped second end to increase surface area of the hydrophobic insert exposed to the fluid.

5. The pressure sensor according to claim 2, wherein the hydrophobic insert is formed from a hydrophobic porous foam material.

6. The pressure sensor according to claim 1, wherein the hydrophobic feature is an enhanced surface which causes the surface to be hydrophobic.

7. The pressure sensor according to claim 6, wherein the enhanced surface is provided by a coating of a hydrophobic material on an inner surface of the communication path.

8. The pressure sensor according to claim 1, wherein the communication path permits a flow of the fluid from a fluid flow path of a fuel cell system to the interior of the housing.

9. The pressure sensor according to claim 1, wherein the undesired material is ice.

10. A pressure sensor comprising:
   a housing having a hollow interior formed therein and an inlet conduit extending outwardly therefrom, the housing having a communication path formed therein including the inlet conduit and an aperture formed in a wall of the housing, wherein the communication path permits a flow of a fluid to the interior of the housing to facilitate a pressure measurement of the fluid; and
   a hydrophobic insert at least partially disposed in the communication path which militates against at least one of a formation and an accumulation of an undesired material in the communication path, the hydrophobic insert having a first end disposed within the inlet conduit of the housing and a second end extending into the fluid flow path.

11. The pressure sensor according to claim 10, wherein the hydrophobic insert entirely fills the inlet conduit.

12. The pressure sensor according to claim 10, wherein the hydrophobic insert has a substantially planar first end and a substantially dome-shaped second end to increase surface area of the porous insert exposed to the fluid.

13. The pressure sensor according to claim 10, wherein the hydrophobic insert is formed from a hydrophobic porous foam material.

14. The pressure sensor according to claim 10, wherein the communication path permits a flow of the fluid from a fluid flow path of a fuel cell system to the interior of the housing.

15. The pressure sensor according to claim 10, wherein the undesired material is ice.

16. A pressure sensor comprising:
   a housing having a hollow interior formed therein and an inlet conduit extending outwardly therefrom; and
   a communication path formed by the inlet conduit and an aperture formed in a wall of the housing, at least a portion of the inlet conduit including an enhanced inner surface which causes the surface to be hydrophobic and militates against at least one of a formation and an accumulation of an undesired material in the communication path, wherein the communication path permits a flow of a fluid to the interior of the housing to facilitate a pressure measurement of the fluid.

17. The pressure sensor according to claim 16, wherein the enhanced surface is provided by a coating of a hydrophobic material on the at least a portion of the inner surface of the communication path.

18. The pressure sensor according to claim 16, wherein the aperture includes an enhanced inner surface which causes the surface to be hydrophobic.

19. The pressure sensor according to claim 16, wherein the communication path permits a flow of the fluid from a fluid flow path of a fuel cell system to the interior of the housing.

20. The pressure sensor according to claim 16, wherein the undesired material is ice.

* * * * *